United States Patent
Gotz

Patent Number: 5,596,070
Date of Patent: Jan. 21, 1997

[54] HIGH MOLECULAR WEIGHT POLYAMIDES OBTAINED FROM NITRILES

[75] Inventor: Walter Götz, Ludwigshafen, Germany

[73] Assignee: BASF Aktiengesellschaft, Ludwigshafen, Germany

[21] Appl. No.: 518,717

[22] Filed: Aug. 24, 1995

[30] Foreign Application Priority Data

Aug. 27, 1994 [DE] Germany ............ 44 30 480.3

[51] Int. Cl.$^6$ .............. C08G 69/00; C08G 69/48
[52] U.S. Cl. .............. 528/310; 528/335; 528/480; 528/502 R; 528/503; 525/420
[58] Field of Search .............. 528/310, 335, 528/480, 502 R, 503; 525/420

[56] References Cited

U.S. PATENT DOCUMENTS

| | | | |
|---|---|---|---|
| 2,245,129 | 6/1941 | Greenewalt | 528/335 |
| 4,437,949 | 8/1985 | Schmidt et al. | 528/335 |
| 4,568,736 | 2/1986 | Curatolo et al. | 528/336 |
| 4,760,129 | 7/1988 | Haering et al. | 528/483 |
| 5,051,491 | 9/1991 | Pipper et al. | 528/335 |
| 5,068,311 | 11/1991 | Horn et al. | 528/324 |
| 5,140,098 | 8/1992 | Pipper et al. | 528/480 |
| 5,185,427 | 2/1993 | Marks | 528/329 |

FOREIGN PATENT DOCUMENTS

| | | |
|---|---|---|
| 038094 | 10/1981 | European Pat. Off. . |
| 405239 | 1/1991 | European Pat. Off. . |
| 479306 | 4/1992 | European Pat. Off. . |
| 3534817 | 4/1987 | Germany . |

*Primary Examiner*—Jeffrey C. Mullis
*Assistant Examiner*—P. Hampton-Hightower
*Attorney, Agent, or Firm*—Keil & Weinkauf

[57] ABSTRACT

High molecular weight polyamides are prepared by
(a) polymerizing monomers selected from the group consisting of aminonitriles of the formula I $$H_2N-(CH_2)_m-CN \qquad I$$

and mixtures of diamines of the formula II $$H_2N-(CH_2)_n-NH_2 \qquad II$$

with dinitriles of the formula III $$NC-(CH_2)_p-CN \qquad III$$

where m, n and p are integers from two to twelve, in a molar diamine/dinitrile ratio of from 0.98:1 to 1.02:1 to give a prepolymer capable of being granulated,
(b) granulating the prepolymer obtained under (a) and
(c) subjecting the granules obtained under (b) to solid-phase postcondensation at from 5° to 100° C. below the melting point of the prepolymer in the presence of an inert gas which contains at least 50% by volume of superheated steam to give a high molecular weight polyamide having a relative viscosity of from 2.3 to 5.0, the difference between the relative viscosity of the resulting prepolymer from stage (a) and that of the high molecular weight polyamide from stage (c) being at least 0.4.

4 Claims, No Drawings

HIGH MOLECULAR WEIGHT POLYAMIDES OBTAINED FROM NITRILES

BACKGROUND OF THE INVENTION

1. Field of the Invention

The present invention relates to an improved process for the preparation of high molecular weight polyamides from cyano-containing monomers by polymerization in a manner known per se to give polyamides having a low molecular weight and subsequent thermal aftertreatment to give high molecular weight polyamides.

The present invention furthermore relates to high molecular weight polyamides, obtainable from aminonitriles and/or a mixture of diamines with dinitriles, the use of the novel polyamides and moldings obtainable therefrom.

2. Description of the Related Art

U.S. Pat. No. 2,245,129 describes the preparation of linear polyamides. Here, an aminonitrile or an equimolar mixture of dinitriles and diamines is converted in a first step, initially to low molecular weight polyamides. In a subsequent second step, the low molecular weight polyamides are subjected to thermal postcondensation by removing ammonia and water at atmospheric pressure or reduced pressure. The disadvantage of this process is, on the one hand, the low polymerization rate in the postcondensation, which is evident from only a slight increase in the relative viscosity of the end product compared with the relative viscosity of the low molecular weight polyamide in the case of long postcondensation times. However, long postcondensation times increase the probability of damage to the polymer and lead to higher energy consumption and to low space-time yields. On the other hand, the end products have a ratio of terminal amino groups to terminal carboxyl groups (TAG/TCG) substantially greater than 1, which adversely affects the melt stability (constancy of molecular weight) during processing.

DE-A 35 34 817 describes the stepwise preparation of linear polyamides from omega-aminoalkanenitriles and excess water in the presence of catalytic compounds. Spinnable polyamides are brought to the desired higher degrees of polymerization in the melt in an inert gas atmosphere, such as nitrogen, or at reduced pressure. The polyamide thus obtained is then granulated, freed from monomers and oligomers by extraction and then dried. Here too, the achievable molecular weights are low, and the TAG/TCG ratio is likewise substantially greater than 1.

EP-A 479 306 describes the preparation of polyamides starting from omega-aminonitriles in the presence of water and with continuous addition of water, both steam and ammonia being removed from the reaction mixture at above 240° C. After the addition of a certain amount of water, the water feed is stopped and the polymer obtained is subjected to final condensation at from 240° to 310° C. until the desired molecular weight is obtained. It is not possible to obtain higher molecular weights owing to the autogenous steam pressure, which shifts the polycondensation equilibrium to low molecular weights. Furthermore, the reaction rate and hence the space-time yield are not sufficiently high.

EP-A 129 195 describes the preparation of high molecular weight polyamides. In the process according to EP-A 129 195, a low molecular weight prepolymer is first prepared from a mixture consisting of diamines and dicarboxylic acids and is then subjected to solid-phase postcondensation with superheated steam until the desired molecular weight is obtained.

SUMMARY OF THE INVENTION

It is an object of the present invention to provide an improved process for the preparation of high molecular weight polyamides from aminonitriles or dinitriles and diamines and mixtures thereof, which on the one hand leads to a faster increase in molecular weight than in the past and which has a lower probability of damage to the polymer in the postcondensation to give high molecular weights and higher processing stability than that according to known methods. In particular, the preparation of yellowed and decarboxylated products should be avoided and the TAG/TCG ratio should not be greater than 1.25.

Furthermore, the polycondensation should also be capable of being carried out with acceptable space-time yields to give high molecular weights even in the absence of a catalyst, which remains in the polymer during polycondensation and hence constitutes an impurity.

DESCRIPTION OF THE PREFERRED EMBODIMENTS

We have found that this object is achieved by a process for the preparation of high molecular weight polyamides from cyano-containing monomers by polymerization in a manner known per se to give polyamides having a low molecular weight and subsequent thermal aftertreatment to give high molecular weight polyamides, which comprises (a) polymerizing monomers selected from the group consisting of aminonitriles of the general formula I $$H_2N—(CH_2)_m—CN \qquad I$$

and mixtures of diamines of the general formula II $$H_2N—(CH_2)_n—NH_2 \qquad II$$

with dinitriles of the general formula III $$NC—(CH_2)_p—CN \qquad III$$

where m, n and p are integers from two to twelve, in a molar diamine/dinitrile ratio of from 0.98:1 to 1.02:1 in a manner known per se, a relative viscosity from 1.4 to 2.0 (measured at a concentration of 1 g of prepolymer per 100 ml in 96% strength by weight sulfuric acid at 23° C.) being chosen for the resulting prepolymers, to give a product capable of being granulated, (b) then granulating the prepolymer obtained under (a) and (c) then subjecting the granules obtained under (b) to solid-phase postcondensation at from 5 to 100° C. below the melting point of the prepolymer in the presence of an inert gas which contains at least 50% by volume of superheated steam to give a high molecular weight polyamide having a relative viscosity of from 2.3 to 5.0 (measured at a concentration of 1 g of polymer per 100 ml in 96% strength by weight sulfuric acid at 23° C.), the difference between the relative viscosity of the resulting prepolymer from stage (a) and that of the high molecular weight polyamide from stage (c) being at least 0.4.

We have also found high molecular weight polyamides, obtainable from aminonitriles and/or from a mixture of diamines with dinitriles, the use of the novel high molecular weight polyamides and moldings obtainable therefrom.

Suitable processes for the preparation of the novel polyamides are known to a person skilled in the art.

The batch process (batchwise preparation method) may be mentioned as being preferred. Here, the aqueous monomer solution is heated in an autoclave to 220°–330° C. in the course of from 0.5 to 3 hours, the resulting pressure of 15 to 50, in particular from 25 to 50, bar being kept very constant for up to 8 hours by releasing excess steam. The autoclave is then let down at constant temperature in the course of from 0.5 to 2 hours until a final pressure of from 1 to 5 bar is reached. The polymer melt is then discharged, cooled and granulated in the usual manner.

Another preferred process is continuous polycondensation.

In this process, an aqueous solution of the monomers having a monomer content of from 30 to 95, preferably from 40 to 90, % by weight is heated to 220°–330° C. under superatmospheric pressure (from 5 to 100 bar) with formation of a prepolymer in the course of from 10 minutes to 3 hours, after which the pressure is let down, prepolymer, ammonia and vapor are continuously separated, the vapor is rectified and any entrained diamines or nitriles are recycled.

The relative viscosity (measured at a concentration of 1 g of prepolymer per 100 ml in 96% strength sulfuric acid at 23° C.) is chosen, according to the invention, in the range of from 1.4 to 2.0, preferably from 1.5 to 1.8.

The ratio of terminal amino groups to terminal carboxyl groups (TAG/TCG) of the prepolymers from stage (a) is in general greater than 2.0, preferably from 10 to 50.

According to the invention, monomers selected from the group consisting of aminonitriles of the general formula I

$$H_2N-(CH_2)_m-CN \qquad I$$

where m is from 2 to 12, preferably from 5 to 12, such as 6-amino-1-cyanopentane (aminocapronitrile), 7-amino-1-cyanohexane, 8-amino-1-cyanoheptane, 9-amino-1-cyanooctane, 10-amino-1-cyanononane, 11-amino-1-cyanodecane or 12-amino-1-cyanoundecane (aminolauronitrile), particularly preferably 6-amino-1-cyanopentane (aminocapronitrile), and mixtures of diamines of the general formula II

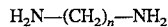

$$H_2N-(CH_2)_n-NH_2 \qquad II$$

where n is from 2 to 12, preferably from 4 to 12, such as tetramethylenediamine, pentamethylenediamine, hexamethylenediamine, heptamethylenediamine, octamethylenediamine, nonamethylenediamine, decamethylenediamine, undecamethylenediamine or dodecamethylenediamine, particularly preferably hexamethylenediamine, are reacted with dinitriles of the general formula III

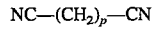

$$NC-(CH_2)_p-CN \qquad III$$

where p is from 2 to 12, preferably from 4 to 10, such as 1,4-dicyanobutane (adiponitrile), 1,5-dicyanopentane, 1,6-dicyanohexane, 1,7-dicyanoheptane, 1,8-dicyanooctane, 1,9-dicyanononane or 1,10-dicyanodecane, particularly preferably 1,4-dicyanobutane (adiponitrile) and 1,8-dicyanooctane.

If desired, diamines, dinitriles and aminonitriles which are derived from branched alkylenes or arylenes or alkylarylenes may also be used.

The molar ratio of diamine to dinitrile is chosen, according to the invention, in the range from 0.98:1 to 1.02:1, preferably from 0.99:1 to 1.01:1.

Observations to date have shown that the aminonitriles of the general formula I can be polymerized in any desired ratio with the mixtures of diamines of the general formula II and dinitriles of the general formula III or mixtures of diamines of the general formula II and dinitriles of the general formula III may be used alone, but preferably the aminonitriles of the general formula I or mixtures of diamines II and dinitriles III alone are used.

If desired, monocarboxylic acids, such as propionic acid and benzoic acid, monoamines, such as alkylamines, eg. methylamine, ethylamine, propylamine or butylamine, or mononitriles, such as acetonitrile, propionitrile, butyronitrile or benzonitrile, may be used as chain regulators in an amount of from 0.01 to 0.5% by weight, based on the monomers used.

The prepolymer from stage (a) is granulated according to the invention, the prepolymer obtained preferably being passed in the form of the melt through a discharge zone with simultaneous removal of the residual water contained in the melt. Suitable discharge zones are, for example, devolatization extruders. The melt substantially freed from water in this manner is then usually extruded and the extrudate is granulated by a conventional method.

The novel granules usually have a length of from 1 to 10 mm, preferably from 3 to 8 mm.

The desired relative viscosity of the high molecular weight polyamide is established in stage (c) of the novel process. According to the invention, this is done by subjecting the granules obtained in stage (b) to solid-phase condensation in the presence of an inert gas which contains at least 50% by volume of superheated steam, preferably pure superheated steam, continuously or batchwise (cf. for example EP-A 284 968).

The temperature in the solid-phase condensation is advantageously chosen so that it is from 5° to 100° C., preferably from 20° to 50° C., below the melting point of the corresponding polyamide. In the case of aminocapronitrile, the temperature is preferably chosen in the range from 130° to 210° C., particularly preferably from 140° to 180° C., very particularly preferably from 150° to 170° C. The residence time in the postcondensation depends essentially on the type of polyamide, on the amount of any chain regulator used, on the chosen temperature and on the desired final value of the relative viscosity. It is as a rule from 2 to 48, preferably from 6 to 24, particularly preferably from 12 to 18, hours.

According to the invention, the heat required for the postcondensation is introduced into the system in the presence of superheated steam and a gas mixture consisting of an inert gas, such as nitrogen, carbon dioxide or argon, and at least 50% by volume of superheated steam may be used for this purpose. Pure superheated steam having a pressure of less than 2 bar is preferably used, the chosen steam:polyamide ratio preferably being more than 10 l of superheated steam per kg of polyamide per hour.

According to the invention, the relative viscosity is adjusted so that it is at least 0.4, preferably at least 0.7, unit higher than the relative viscosity of the prepolymer from stage (a), a relative viscosity of from 2.3 to 5.0, preferably from 2.4 to 4.0 (measured at a concentration of 1 g of polymer per 100 ml in 96% strength by weight sulfuric acid at 23° C.) being established.

For example, tumbling dryers may be used for the batchwise solid-phase condensation and heating tubes for the continuous solid-phase condensation, the continuous solid-phase condensation being preferably used.

Preferred novel high molecular weight polyamides are essentially composed of repeating units of the general formula IV $$[-NH-(CH_2)_m-C(O)-]_x[-NH-(CH_2)_n-NH-]_y[-C(O)-(CH_2)_p-C(O)-]_z \quad \text{IV}$$

where $0 \leq x \leq 1$, $0 \leq y \leq 1$, $0 \leq z \leq 1$, and x:y:z is chosen in the range from 1:0:0 to 0:1:1, and y:z is chosen in the range from 0.98:1 to 1.02:1, and are obtainable by (a) preparing a polyamide prepolymer by polymerization of a mixture of aminonitriles of the general formula I $$H_2N-(CH_2)_m-CN \quad \text{I}$$

and mixtures of diamines of the general formula II $$H_2N-(CH_2)_n-NH_2 \quad \text{II}$$

with dinitriles of the general formula III $$NC-(CH_2)_p-CN \quad \text{III}$$

where m, n and p are integers from two to twelve, with a molar diamine/dinitrile ratio of from 0.98:1 to 1.02:1, a relative viscosity of from 1.4 to 2.0 (measured at a concentration of 1 g of prepolymer per 100 ml in 96% strength by weight sulfuric acid at 23° C.) being chosen for the resulting prepolymers, to give a product capable of being granulated, (b) then granulating the prepolymer obtained under (a) and (c) then subjecting the granules obtained under (b) to solid-phase postcondensation at from 5° to 100° C. below the melting point of the prepolymer in the presence of an inert gas which contains at least 50% by volume of superheated steam to give a high molecular weight polyamide having a relative viscosity of from 2.3 to 5.0 (measured at a concentration of 1 g of polymer per 100 ml in 96% strength by weight sulfuric acid at 23° C.), the difference between the relative viscosity of the resulting prepolymer from stage (a) and that of the high molecular weight polyamide from stage (c) being at least 0.4, with the proviso that the high molecular weight polyamides obtained have a ratio of terminal amino groups to terminal carboxyl groups of less than 1.25.

Particularly preferred high molecular weight polyamides are those which are essentially composed of repeating units of the general formula V $$[-NH-(CH_2)_m-C(O)-] \quad \text{V}$$

obtainable by (a) preparing a polyamide prepolymer by polymerization of aminonitriles of the general formula I $$H_2N-(CH_2)_m-CN \quad \text{I}$$

where m is an integer from two to twelve, in a manner known per se, a relative viscosity of from 1.4 to 2.0 (measured at a concentration of 1 g of prepolymer per 100 ml in 96% strength by weight sulfuric acid at 23° C.) being chosen for the resulting prepolymers, to give a product capable of being granulated, (b) then granulating the prepolymer obtained under (a) and (c) then subjecting the granules obtained under (b) to solid-phase postcondensation at from 5° to 100° C. below the melting point of the prepolymer in the presence of an inert gas which contains at least 50% by volume of superheated steam to give a high molecular weight polyamide having a relative viscosity of from 2.3 to 5.0 (measured at a concentration of 1 g of polymer per 100 ml in 96% strength by weight sulfuric acid at 23° C.), the difference between the relative viscosity of the resulting prepolymer from stage (a) and that of the high molecular weight polyamide from stage (c) being at least 0.4, with the proviso that the high molecular weight polyamides obtained have a ratio of terminal amino groups to terminal carboxyl groups of less than 1.25.

Other particularly preferred high-molecular weight polyamides are those which are essentially composed of repeating units of the general formula VI $$[-NH-(CH_2)_n-NH-]_a[-C(O)-(CH_2)_p-C(O)-]_b \quad \text{VI}$$

where a:b is chosen in the range from 0.98:1 to 1.02:1, are obtainable by (a) preparing a polyamide prepolymer by polymerization of a mixture of diamines of the general formula II $$H_2N-(CH_2)_n-NH_2 \quad \text{II}$$

with dinitriles of the general formula III $$NC-(CH_2)_p-CN \quad \text{III}$$

where n and p are integers from two to twelve, in a molar diamine/dinitrile ratio of from 0.98:1 to 1.02:1, a relative viscosity of from 1.4 to 2.0 (measured at a concentration of 1 g of prepolymer per 100 ml in 96% by weight sulfuric acid at 23° C.) being chosen for the resulting prepolymers, to give a product capable of being granulated, (b) then granulating the prepolymer obtained under (a) and (c) then subjecting the granules obtained under (b) to solid-phase postcondensation at from 5° to 100° C. below the melting point of the prepolymer in the presence of an inert gas which contains at least 50% by volume of superheated steam to give a high molecular weight polyamide having a relative viscosity of from 2.3 to 5.0 (measured at a concentration of 1 g of polymer per 100 ml in 96% by weight sulfuric acid at 23° C.), the difference between the relative viscosity of the resulting prepolymer from stage (a) and that of the high molecular weight polyamide from stage (c) being at least 0.4, with the proviso that the high molecular weight polyamides obtained have a ratio of terminal amino groups to terminal carboxyl groups of less than 1.25.

In a subsequent compounding step, the conventional assistants and additives, such as reinforcing fibers, mineral fillers, tougheners, lubricants and mold release agents, heat stabilizers and UV stabilizers, flameproofing agents, pigments, dyes and nucleating agents, in amounts of up to 70% by weight, based on the compounded product, may be added to the novel polyamides.

In the case of the continuous polycondensation, the additives may alternatively be mixed into the novel prepolymer with the aid of a discharge extruder and then subjected to stage c).

The novel high molecular weight polyamides may be further processed by conventional methods to give moldings, films and fibers.

Compared with known processes, the novel process has the advantage that the increase in molecular weight takes place more rapidly and the high molecular weight polyamides according to the novel process exhibit less damage or no damage, in particular as a result of yellowing or decarboxylation, and have a TAG/TCG ratio of not more than 1.25.

EXAMPLES

The terminal carboxyl groups were determined by acidimetric titration (double determination). For this purpose, a blank value and a factor were first determined, after which the measurement was repeated with the polyamide to be investigated and the terminal group content was determined therefrom.

To determine the blank value, 30 ml of distilled benzyl alcohol were refluxed for 15 minutes on a hot plate with the addition of some glass boiling beads and, after the addition of 6 drops of indicator (50 mg of cresol red dissolved in 50 ml of n-propanol p.a., then titrated hot with the titrating solution (80 ml of 0.5M methanolic KOH solution/860 ml of n-propanol made up to 2,000 ml with hexanol) until the color change (yellow-gray).

To determine the factor, the experiment was repeated, except that 0.015 g of AH salt was added to the benzyl alcohol. The factor was calculated from the weight of AH salt: [consumption—blank value: 131.2].

For the sample determination, the experiment was repeated with 0.5 g of the polyamide to be investigated.

The content of terminal carboxyl groups, in mmol/kg, was then calculated from [consumption—blank value] x factor: sample weight.

The terminal amino groups were determined by acidimetric titration (double determination). For this purpose, a blank value and a factor were first determined, after which the measurement was repeated with the polyamide to be determined and the terminal group content was determined therefrom.

To determine the blank value, 25 ml of a solvent mixture (1,000 g of phenol p.a./540 g of methanol p.a./1 ml of 0.1M methanol KOH solution) were refluxed for 25 minutes at from 150° to 160° C. using a magnetic stirrer. After the mixture had been cooled to hand heat, 2 drops of indicator (0.1 g of benzyl orange/10 ml of methanol p.a. made up to 100 ml with ethylene glycol +500 mg of methylene blue/5 ml of methanol p.a. made up to 50 ml with ethylene glycol) were added to the solvent mixture and titration was carried out with the titrating solution (3.44 ml of 70% strength by weight perchloric acid/200 ml of methanol p.a. made up to 2,000 ml with ethylene glycol) until the color change (green-gray).

To determine the factor, the experiment was repeated with 25 ml of factor solution (0.16 g of dried AH salt dissolved in 500 ml of solvent mixture) instead of the pure solvent mixture. The factor was then calculated from the weight of AH salt: [consumption—blank value: 131.2].

For the sample determination, the experiment was repeated with 0.5 g of the polyamide to be investigated, dissolved in 25 ml of the solvent mixture.

The content of terminal amino groups, in mmol/kg, was then calculated from [consumption—blank value] x factor: sample weight.

1. Preparation of the starting materials

Example A 2.5 mol of aminocapronitrile ACN (280 g; purity>99.8%) were initially taken with 10 mol of $H_2O$ (90 g) and 5 mmol of phosphorous acid as a catalyst in a 1 l laboratory autoclave. Once again, the autoclave was evacuated 3 times and was filled with nitrogen. Heating was then carried out at 220° C. for 1 hour, the pressure being kept constant after reaching 20 bar by releasing superheated steam and ammonia. This temperature was maintained for 2 hours, after which the temperature was increased to 270° C. in the course of 1 hour and the pressure was still kept at 20 bar. The pressure was then let down to atmospheric pressure in the course of 20 minutes, and the product was discharged, extruded, cooled in water and granulated. Cylindrical granules having a length of about 4 mm and a diameter of from 2 to 3 mm were obtained.

Example B

As for A, but without a catalyst.

Example C

As for B, but with 5 mol of $H_2O$.

2. Postcondensation 60 g/h of superheated steam at 170° C. were passed at atmospheric pressure through 2.5 g samples of the granules (loose bed) in a glass tube of about 10 mm internal diameter, which was immersed in an oil bath at 170° C. In comparative experiments, dry nitrogen was also used or reduced pressure (oil pump, <1 mbar) was applied, and the temperature was 170° C. in each case.

In a further comparative experiment, a 2.5 g sample was melted (layer thickness about 2–3 mm) at the bottom of a 50 ml conical flask in an oil bath at 250° C., and 60 g/h of superheated steam (250° C.) were passed over the resulting melt.

The results are shown in the table. The values measured on the samples before postcondensation are shown as experiment 0.

The values show that a more rapid increase in molecular weight and a high final molecular weight are achieved only by solid-phase postcondensation with steam. No industrially useful molecular weights are obtained using nitrogen or reduced pressure as the heating medium, and a slow increase in molecular weight, yellowing and decarboxylation (detectable from the decrease in the TCG compared with the TAG) are observed as a result of treatment of a polymer melt with superheated steam (in this case, the temperature of the steam must of course be higher than the melting point of the polyamide).

The relative viscosity (RV) was determined at a concentration of 1 g of polymer per 100 ml in 96% strength by weight sulfuric acid at 23° C.

| Experiment | Heating time h | Heating medium | Temperature °C. | RV | TAG mmol/kg | TCG mmol/kg | Color |
|---|---|---|---|---|---|---|---|
| A-0 | 0 | — | 170 | 1.96 | 89 | 34 | white |
| A-1 | 6 | H$_2$O | 170 | 2.06 | 77 | 65 | white |
| A-2 | 12 | H$_2$O | 170 | 2.27 | 70 | 90 | white |
| A-3 | 18 | H$_2$O | 170 | 2.31 | 52 | 81 | white |
| A-4 | 24 | H$_2$O | 170 | 2.44 | 45 | 79 | white |
| A-5 | 40 | H$_2$O | 170 | 2.80 | 40 | 66 | white |
| A-6 | 6 | N$_2$ | 170 | 2.03 | 80 | 25 | white |
| A-7 | 12 | N$_2$ | 170 | 2.09 | 75 | 21 | white |
| A-8 | 24 | N$_2$ | 170 | 2.12 | 71 | 20 | white |
| A-9 | 6 | reduced pressure | 170 | 2.05 | 79 | 25 | white |
| A-10 | 12 | reduced pressure | 170 | 2.11 | 75 | 24 | white |
| A-11 | 24 | reduced pressure | 170 | 2.16 | 70 | 17 | white |
| A-12 | 6 | melt/H$_2$O | 250 | 2.00 | 82 | 64 | slightly beige |
| A-13 | 12 | melt/H$_2$O | 250 | 2.05 | 79 | 90 | white |
| A-14 | 24 | melt/H$_2$O | 250 | 2.10 | 74 | 101 | white |
| B-0 | 0 | H$_2$O | 185 | 1.69 | 141 | 18 | white |
| B-1 | 6 | H$_2$O | 185 | 1.89 | 109 | 102 | white |
| B-2 | 12 | H$_2$O | 185 | 2.32 | 75 | 78 | white |
| B-3 | 24 | H$_2$O | 185 | 2.74 | 53 | 58 | white |
| B-4 | 40 | H$_2$O | 185 | 3.66 | 31 | 40 | white |
| B-5 | 6 | N$_2$ | 185 | 1.75 | 133 | 25 | white |
| B-6 | 12 | N$_2$ | 185 | 1.80 | 120 | 22 | white |
| B-7 | 24 | N$_2$ | 185 | 1.91 | 104 | 20 | white |
| B-8 | 40 | N$_2$ | 185 | 1.93 | 99 | 7 | white |
| C-0 | 0 | — | 185 | 1.44 | 230 | 12 | white |
| C-1 | 6 | H$_2$O | 185 | 1.79 | 125 | 108 | white |
| C-2 | 12 | H$_2$O | 185 | 2.24 | 78 | 85 | white |
| C-3 | 24 | H$_2$O | 185 | 2.69 | 55 | 60 | white |
| C-4 | 40 | H$_2$O | 185 | 3.54 | 33 | 43 | white |
| C-5 | 6 | N$_2$ | 185 | 1.55 | 186 | 24 | white |
| C-6 | 12 | N$_2$ | 185 | 1.69 | 145 | 19 | white |
| C-7 | 24 | N$_2$ | 185 | 1.84 | 115 | 22 | white |
| C-8 | 40 | N$_2$ | 185 | 1.88 | 107 | 17 | white |
| C-9 | 24 | melt/H$_2$O | 250 | 2.12 | 80 | 85 | slightly beige |
| C-10 | 40 | melt/H$_2$O | 250 | 2.33 | 65 | 78 | slightly beige |

We claim:

1. A process for the preparation of high molecular weight polyamides from cyano- or amino-containing monomers which comprises:

(a) polymerizing monomers selected from the group consisting of aminonitriles of the formula I $$H_2N-(CH_2)_m-CN \qquad I$$

and mixtures of diamines of the formula II $$H_2N-(CH_2)_n-NH_2 \qquad II$$

with dinitriles of the formula III $$NC-(CH_2)_p-CN \qquad III$$

where m, n and p are integers from two to twelve, in a molar diamine/dinitrile ratio of from 0.98:1 to 1.02:1 a relative viscosity from 1.4 to 2.0 (measured at a concentration of 1 g of prepolymer per 100 ml in 96% strength by weight sulfuric acid at 23° C.) being chosen for the resulting prepolymers, to give a product capable of being granulated, (b) granulating the prepolymer obtained under (a) and (c) subjecting the granules obtained under (b) to solid-phase postcondensation at from 5° to 100° C. below the melting point of the prepolymer in the presence of an inert gas which contains at least 50% by volume of superheated steam to give a high molecular weight polyamide having a relative viscosity of from 2.3 to 5.0 (measured at a concentration of 1 g of polymer per 100 ml in 96% strength by weight sulfuric acid at 23° C.), the difference between the relative viscosity of the resulting prepolymer from stage (a) and that of the high molecular weight polyamide from stage (c) being at least 0.4.

2. A high molecular weight polyamide consisting essentially of repeating units of the formula IV $$[-NH-(CH_2)_m-C(O)-]_x[-NH-(CH_2)_n-NH-]_y[-C(O)-(CH_2)_p-C(O)-]_z \qquad IV$$

where $0 \leq x \leq 1$, $0 \leq y \leq 1$, $0 \leq z \leq 1$, and x:y:z is in the range from 1:0:0 to 0:1:1, and y:z is in the range from 0.98:1 to 1.02:1, are obtained by (a) preparing a polyamide prepolymer by polymerization of a mixture of aminonitriles of the formula I $$H_2N-(CH_2)_m-CN \qquad I$$

and mixtures of diamines of the formula II $$H_2N-(CH_2)_n-NH_2 \qquad II$$

with dinitriles of the formula III $$NC-(CH_2)_p-CN \qquad III$$

where m, n and p are integers from two to twelve, with the resulting prepolymer having a molar diamine/dinitrile ratio of from 0.98:1 to 1.02:1, a relative viscosity of from 1.4 to 2.0 (measured at a concentration of 1 g of prepolymer per 100 ml in 96% strength by weight sulfuric acid at 23° C.) to give a product capable of being granulated, (b) granulating the prepolymer obtained under (a) and (c) subjecting the granules obtained under (b) to solid-phase postcondensation at from 5° to 100° C. below the melting point of the prepolymer in the presence of an inert gas which contains at least 50% by volume of superheated steam to give a high molecular weight polyamide having a relative viscosity of from 2.3 to 5.0 (measured at a concentration of 1 g of polymer per 100 ml in 96% strength by weight sulfuric acid at 23° C.), the difference between the relative viscosity of the resulting prepolymer from stage (a) and that of the high molecular weight polyamide from stage (c) being at least 0.4, with the proviso that the high molecular weight polyamides obtained have a ratio of terminal amino groups to terminal carboxyl groups of less than 1.25.

3. A high molecular weight consisting essentially of repeating units of the formula V $$[-NH-(CH_2)_m-C(O)-] \qquad V$$

obtained by (a) preparing a polyamide prepolymer by polymerization of aminonitriles of the formula I $$H_2N-(CH_2)_m-CN \qquad I$$

where m is an integer from two to twelve, in a manner known per se, a relative viscosity of from 1.4 to 2.0 (measured at a concentration of 1 g of prepolymer per 100 ml in 96% strength by weight sulfuric acid at 23° C.) being chosen for the resulting prepolymers, to give a product capable of being granulated, (b) granulating the prepolymer obtained under (a) and (c) subjecting the granules obtained under (b) to solid-phase postcondensation at from 5° to 100° C. below the melting point of the prepolymer in the presence of an inert gas which contains at least 50% by volume of superheated steam to give a high molecular weight polyamide having a relative viscosity of from 2.3 to 5.0 (measured at a concentration of 1 g of polymer per 100 ml in 96% strength by weight sulfuric acid at 23° C.), the difference between the relative viscosity of the resulting prepolymer from stage (a) and that of the high molecular weight polyamide from stage (c) being at least 0.4, with the proviso that the high molecular weight polyamides obtained have a ratio of terminal amino groups to terminal carboxyl groups of less than 1.25.

4. A high molecular weight polyamide consisting essentially of repeating units of the formula VI $$[-NH-(CH_2)_{n-NH-}]_a[-C(O)-(CH_2)_p-C(O)-]_b \qquad VI$$

where a:b is chosen in the range from 0.98:1 to 1.02:1, obtained by (a) preparing a polyamide prepolymer by polymerization of a mixture of diamines of the formula II $$H_2N-(CH_2)_n-NH_2 \qquad II$$

with dinitriles of the formula III $$NC-(CH_2)_p-CN \qquad III$$

where n and p are integers from two to twelve, in a molar diamine/dinitrile ratio of from 0.98:1 to 1.02:1, the resulting prepolymer having viscosity of from 1.4 to 2.0 (measured at a concentration of 1 g of prepolymer per 100 ml in 96% by weight sulfuric acid at 23° C.), to give a product capable of being granulated, (b) granulating the prepolymer obtained under (a) and (c) subjecting the granules obtained under (b) to solid-phase postcondensation at from 5° to 100° C. below the melting point of the prepolymer in the presence of an inert gas which contains at least 50% by volume of superheated steam to give a high molecular weight polyamide having a relative viscosity of from 2.3 to 5.0 (measured at a concentration of 1 g of polymer per 100 ml in 96% by weight sulfuric acid at 23° C.), the difference between the relative viscosity of the resulting prepolymer from stage (a) and that of the high molecular weight polyamide from stage (c) being at least 0.4, with the proviso that the high molecular weight polyamides obtained have a ratio of terminal amino groups to terminal carboxyl groups of less than 1.25.

* * * * *

UNITED STATES PATENT AND TRADEMARK OFFICE
CERTIFICATE OF CORRECTION

PATENT NO.: 5,596,070

DATED: January 21, 1997

INVENTOR(S): Walter GOETZ

It is certified that error appears in the above-identified patent and that said Letters Patent is hereby corrected as shown below:

Column 9, claim 1, line 41, delete "high molecular weight".

Column 9, claim 1, line 61, "1.02:1 a" should read --1.02:1, a--.

Column 12, claim 4, line 17, "[—NH—(CH$_2$)$_n$—NH—]$_a$[—C(O)—(CH$_2$)$_p$—C(O)—]$_b$ " should be --[-NH-(CH$_2$)$_n$-NH-]$_a$[-C(O)-(CH$_2$)$_p$-C(O)-]$_b$ --.

Signed and Sealed this

Fifteenth Day of April, 1997

*Attest:*

BRUCE LEHMAN

*Attesting Officer*     *Commissioner of Patents and Trademarks*